(12) United States Patent
Heitlinger

(10) Patent No.: US 7,048,294 B2
(45) Date of Patent: May 23, 2006

(54) LOCKING BOLT FOR A TOWING DEVICE

(75) Inventor: Martin Heitlinger, Östringen-Odernheim (DE)

(73) Assignee: Deere & Company, Moline, IL (US)

( * ) Notice: Subject to any disclaimer, the term of this patent is extended or adjusted under 35 U.S.C. 154(b) by 31 days.

(21) Appl. No.: 10/848,471

(22) Filed: May 18, 2004

(65) Prior Publication Data

US 2004/0232655 A1 Nov. 25, 2004

(30) Foreign Application Priority Data

May 21, 2003 (DE) .................................. 103 22 933

(51) Int. Cl.
*B60D 1/02* (2006.01)
(52) U.S. Cl. ...................... 280/507; 280/515; 403/318; 403/322
(58) Field of Classification Search ........ 280/507–510, 280/515; 403/150, 154, 155, 318, 322; 411/316, 411/317, 351, 513

See application file for complete search history.

(56) References Cited

U.S. PATENT DOCUMENTS

| 2,638,809 | A | * | 5/1953 | Blattner | ...................... 411/351 |
| 2,801,564 | A | * | 8/1957 | Blattner | ...................... 411/351 |
| 4,236,439 | A | * | 12/1980 | Imai | ............................ 411/346 |
| 4,553,891 | A | | 11/1985 | Aubrun | ........................ 411/351 |
| 4,555,125 | A | * | 11/1985 | Goodlove | ................... 280/515 |
| 5,061,133 | A | * | 10/1991 | May et al. | ................... 411/340 |
| 5,769,559 | A | * | 6/1998 | Olson | ........................ 403/322.1 |
| 5,921,699 | A | * | 7/1999 | Olson | ........................ 403/322.1 |
| 6,145,866 | A | * | 11/2000 | Peter | ............................ 280/515 |
| 6,568,894 | B1 | * | 5/2003 | Golden et al. | .............. 411/351 |
| 2002/0069681 | A1 | | 6/2002 | Golden et al. | ................. 70/34 |

FOREIGN PATENT DOCUMENTS

| DE | 1625300 | 7/1951 |
| DE | 1 196 904 | 7/1965 |
| DE | 27 58 170 | 6/1979 |
| DE | 29 24 759 | 1/1981 |
| DE | 218550 | 4/1990 |
| FR | 2 497 888 | 7/1982 |
| NL | 285227 | 1/1965 |

* cited by examiner

*Primary Examiner*—Lesley D. Morris
*Assistant Examiner*—L. Lum

(57) ABSTRACT

A securing bolt device is inserted into a bore of a subassembly body. The device has a bolt and a spring element. The bolt has a shank which is insertable into the bore. A radial transverse bore extends through an end portion of the shank opposite to the insertable portion of the shank, and the shank has a blind bore in an axially directed end face. The spring element includes a loop, a first end of which is insertable into the transverse bore and a second end which is insertable into the end face bore. The loop forms a crossmember which extends across the shank of the bolt, and pressed against the bolt element by the spring force of the spring element. The locking device includes a subassembly body having a bore in which the bolt is axially movable. In a locked state a free end of the shank extends out of the bore and locks the securing bolt.

8 Claims, 5 Drawing Sheets

LOCKING BOLT FOR A TOWING DEVICE

BACKGROUND

The present invention relates to a locking bolt for a towing device.

Numerous types of securing bolt devices are known for releasably securing structural components, including spring-loaded plugs or pins (as described in Standard DIN 11,024) and spring-loaded bolts.

U.S. published patent application A 2002/0069681 shows fasteners with locking pins which are installable and removable from a joint or other installation. A prior art locking pin has a cylindrical shank having a head member formed at one end. A transverse bore runs through the shank near the opposite end. The bore receives a cotter pin with a leg which may be bent to prevent removal of the bolt from the bore.

Netherlands published application No. NL A 285227 describes, inter alia, a securing device for machine elements, having a bolt which has a transverse bore near its end and has an axial blind hole at its end face. The securing device also includes a round steel wire blocking member. One end of the steel wire is received by the transverse bore and the other end is received by the blind hole. Between its two ends the steel wire forms a loop which extends laterally from the bolt. This securing device is difficult to loosen by hand, and is therefore unsuitable for use in situations such as towing elements, where the connection must frequently be released.

SUMMARY

Accordingly, an object of this invention is to provide a securing bolt for a towing device which provides a reliable secure hold.

A further object of the invention is to provide such a securing bolt which requires a small number of simple, inexpensive parts.

A further object of the invention is to provide such a securing bolt which is easy to operate, and which can be easily released without the use of tools.

These and other objects are achieved by the present invention, wherein a securing bolt is inserted into a hole in a towing body and is secured by a spring-loaded element. The bolt includes a shank which can be inserted into the hole and a transverse bore extends radially through an end of the bolt. A central axial blind bore extends into an end face of the bolt opposite to the end which is insertable into the hole. A wire spring element has a first end received by the transverse bore and a second end received by the axial bore. The spring element forms a bend or loop which extends between the two ends. A portion of the loop forms a surface which extends parallel to the axis of the bolt. A portion of the loop at least partially crosses the main axis of the bolt. In a mounted state, the spring element is pre-stressed such that part of the loop is pressed by a spring force against the bolt, and crosses near an end of the bolt. The loop can be lifted off of the bolt by hand by exerting a predetermined force. When the securing bolt device is employed, the lifting of the loop causes release of the locked position of the bolt, whereupon the bolt can be displaced axially within the hole.

The bolt is preferably completely cylindrical, possibly with chamfered ends. However, the bolt may have other forms and cross sections. It is not necessary for the bolt to have a head (formed, e.g., by forging) such as is typical of known hinge-mounted pins.

The spring element may be comprised of spring steel, and may have a simple shape. The loop of the spring element is urged toward the bolt element in all possible operating positions. Accordingly, the spring element always assumes a fixed position and does move relative to the bolt (which might cause clapping noises). The bolt is always pre-stressed when in its closed position. It is therefore not necessary to consciously lock the bolt device in the closed position after the securing position is set up. This is in contrast to typical hinge-mounted pins, which can adopt an open or a closed position and which do not automatically lock.

The diameter of the bolt may be selected independently of the diameter of the spring element employed as the securing spring. In contrast to the usual spring-loaded pin devices, the bolt and the spring element may be comprised of different materials, which can be optimally adapted to the given application situation. It is not invariably necessary for the bolt to be heat treated for all applications.

Because the ends of the spring element are stressed in two bores which extend in mutually perpendicular directions (transverse bore and end face bore), the spring element is securely attached to the bolt and can be removed only by exerting a relatively high force.

This securing bolt device can advantageously replace customary spring-loaded pins or hinge-mounted pins in numerous applications, and offers substantial new advantages in numerous applications, beyond the advantages offered by customary spring-loaded pins and hinge-mounted pins.

The securing bolt device can basically have a universal form. However, according to a preferred embodiment of the invention, the spring element is essentially in the form of a bent wire in a G-shape. The base part of the "G" forms a loop which rests against the shank of the bolt. The central, horizontally directed end segment of the "G" forms the first end of the spring element, which is inserted into the transverse bore in the bolt. The upper, vertically downwardly directed end segment of the "G" forms the second end of the spring element, which is inserted into the axially extending end face bore of the bolt. The two ends of the spring element are preferably straight, so that they can be effortlessly inserted into tight transverse bore or end face bore, respectively. The portion of the loop which presses against the shank of the bolt may have a wider shape, so as to have lateral extensions which the operator can easily access and manipulate.

This locking device includes a subassembly body with a bore, and a securing bolt device having a bolt which is axially displaceable in the bore. In the locked state, the free end of the shank of the securing bolt extends out of the bore.

Preferably the subassembly body has a front face from which the bore opens out and which extends essentially perpendicularly to the bore axis. In the locked state of the securing bolt device, a portion of the spring element loop engages over the front face, and thereby prevents axial withdrawal of the bolt. Because the pre-stressing of the spring element urges the spring element towards the shank of the bolt, the loop of the spring element automatically moves over the front face as soon as possible via the displacement of the bolt. Thus, no additional means are needed to cause the spring element (and with it, the bolt) to adopt its locked position.

It is particularly advantageous if the subassembly body has a step shape, so that at least one end face parallel to the front face is formed, with which a portion of the loop of the spring element can engage over such end face when the securing bolt device is in an unlocked position. When the loop of the spring element engaged over the end face, the securing bolt is in an unlocked position. Thus, when the locking bolt is in this unlocked position it is still securely attached to the subassembly body.

Preferably, the axial distance between the front face and the end face of the subassembly body is equal to or greater than the length of the segment of the bolt shank which extends out of the bore when in the locked state. As a result, the free end of the bolt element shank is in the unlocked state completely, and reliably disappears into the bore and does not project over the end face of the subassembly body. Thereby, reliable unlocking is assured.

Preferably, the subassembly body has an inclined ramp surface to facilitate the initial mounting of the securing bolt device onto the subassembly body, wherein the bolt is introduced into the bore and the spring element is lifted slightly away from the bolt shank, in order to be placed onto the ramp. If the bolt element is now pushed farther into the bore, the loop of the spring element slides up the ramp and eventually snaps over the end face (or the front face) as soon as it reaches the corresponding position.

This locking device can be used to secure a towing bolt in a towing fixture on an agricultural or industrial vehicle, such as an agricultural tractor or other towing vehicle. With such an arrangement, an upper part may be screwed onto a towbar of a towing vehicle, or may be otherwise fixed to said towbar. The end of the towbar may be regarded as a first leg member and the upper part may be regarded as a second leg member, wherewith an intermediate space is formed between these two leg members, for accommodating the towing eye of a towed implement or vehicle. Vertical bores extend through the towbar and the upper part, and receive a towing bolt. To prevent the towing bolt from being lost when the vehicle is underway, a displaced housing piece, such as a subassembly body, is fixed to the upper part at a suitable distance from the bore, such as by forming, welding, or screwing. The housing piece has a bore which is essentially horizontal and is essentially perpendicular to the axis of the towing bolt. This bore receives the securing bolt.

The securing bolt can be displaced in the bore, to a first position wherein the shank of the securing bolt extends out of the bore and extends beyond the outer contour of the housing piece. Under these circumstances the shank extends into the path of movement of the towing bolt, and it may be disposed directly over the upper end face of the towing bolt, or may be received in a transverse bore of the towing bolt. In this way the securing bolt prevents the towing bolt from being removed from the bores. If the spring element is released, the securing bolt can be withdrawn from its first position to a detent position. In this second position the bolt does not extend (or does not appreciably extend) beyond the bore, so that there is no longer any form-interlocking engagement of the bolt with the towing bolt. In its second position the securing bolt does not influence the towing bolt, so that the towing bolt can be partially or completely withdrawn from its bores, thereby allowing, insertion or removal of a trailer towing eye. When the securing bolt is displaced out of its second, unlocked position into its first, locked position, the spring element automatically snaps into its locked position.

Preferably, the subassembly body has a through bore which is perpendicular to its other bore which receives the securing bolt. The through bore is for receiving the towing bolt. The towing bolt preferably has a transverse bore for receiving the securing bolt in order to secure the towing bolt against axial displacement with respect to the subassembly body.

The connecting bolt may be used to connect a towbar to a vehicle frame (e.g., at the differential housing). The bearing part of the towbar may have a suitable step shape for this. There are numerous other potential areas of application for the inventive securing bolt device and the inventive locking device.

The towing element, particularly a towbar device or towing fitting, has an upper leg member and a lower leg member, between which an intermediate space for accommodating a trailer eye is formed. Aligned bores pass vertically through the upper and lower leg members for receiving a towing bolt. The locking device is disposed on the upper leg member. In the locked state the shank of the bolt extends out of the bore of the locking device and into the path of movement of the towing bolt so as to engage said towing bolt, and prevents axial movement of said towing bolt. Said shank segment may also prevent rotation of said towing bolt. A similar arrangement may be employed to fix a towbar to a vehicle frame by means of a towbar bolt.

Preferably the towing bolt has a larger diameter head and a smaller diameter shank. In the locked state a portion of the shank extends out of the bore and engages an end face of the head.

DETAILED DESCRIPTION

Figure 1:
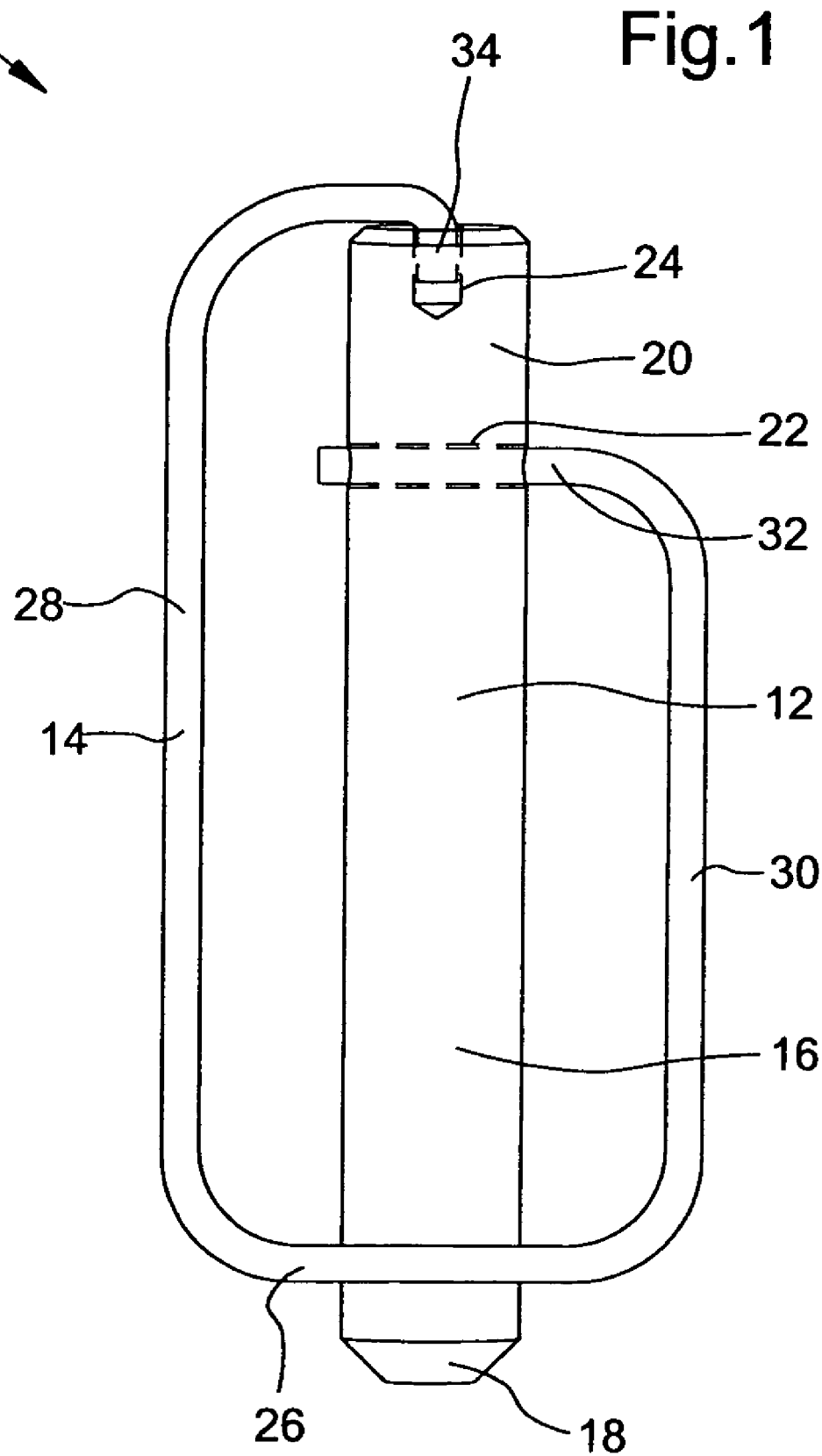
FIG. 1 is a side view of a securing bolt device, with a bolt element and a spring element, according to the present invention.

Referring to FIG. 1, a securing bolt device 10 includes a bolt element 12 and a spring element 14. The bolt element 12 is cylindrical and has a shank 16 which is insertable into a hole, such as hole 60 of FIGS. 2 and 3. The end 18 of shank 16 has a chamfer which facilitates insertion into the hole 60. A transverse bore 22 extends through shank 16 near end 20. A central axial blind bore 24 extends into an end face of end 20.

The spring element 14 is comprised of a spring-steel wire having a circular cross section, and which has an essentially G-shape. The spring element 14 includes a bottom cross-member 26 and two parallel legs 28, 30 which forms a U-shaped loop. The spring element includes a first end member 32 which is bent inwardly at 90 degrees with respect to leg 30. First end member 32 is received by and extends through the transverse bore 22. A second upper, vertically directed end member 34 is bent inwardly at 180 degrees with respect to leg 28 and is received by bore 24. The spring element 14 is pre-stressed such so that cross-member 26 is urged against and forcibly held against the shank 16 of the bolt element 12. The operator can lift the crossmember 26 slightly away from the shank 16.

Figure 2:
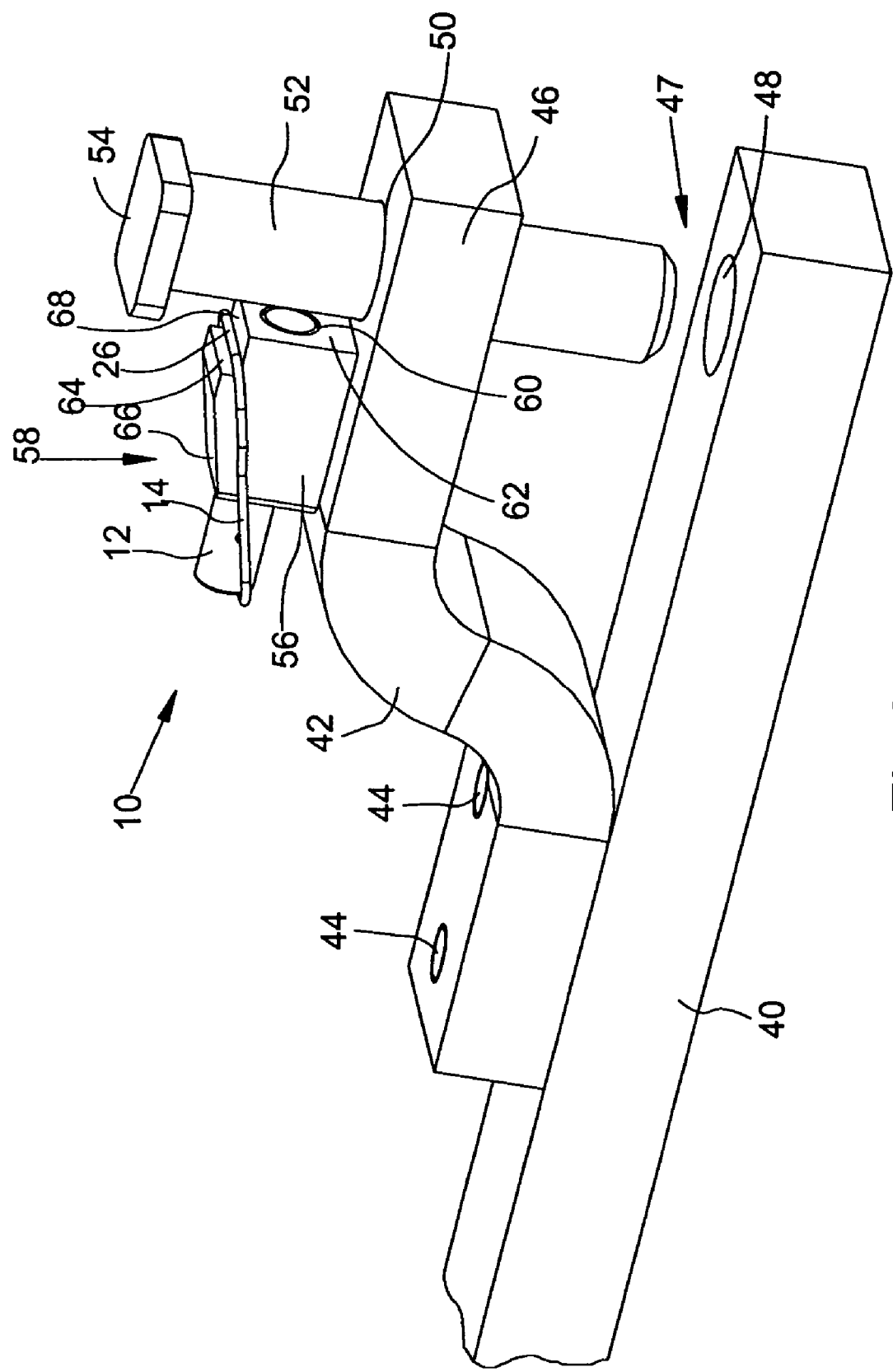
FIG. 2 is a perspective view of a towing device having a locking device for locking the towing bolt in an un-locked condition according to the present invention.
Figure 3:
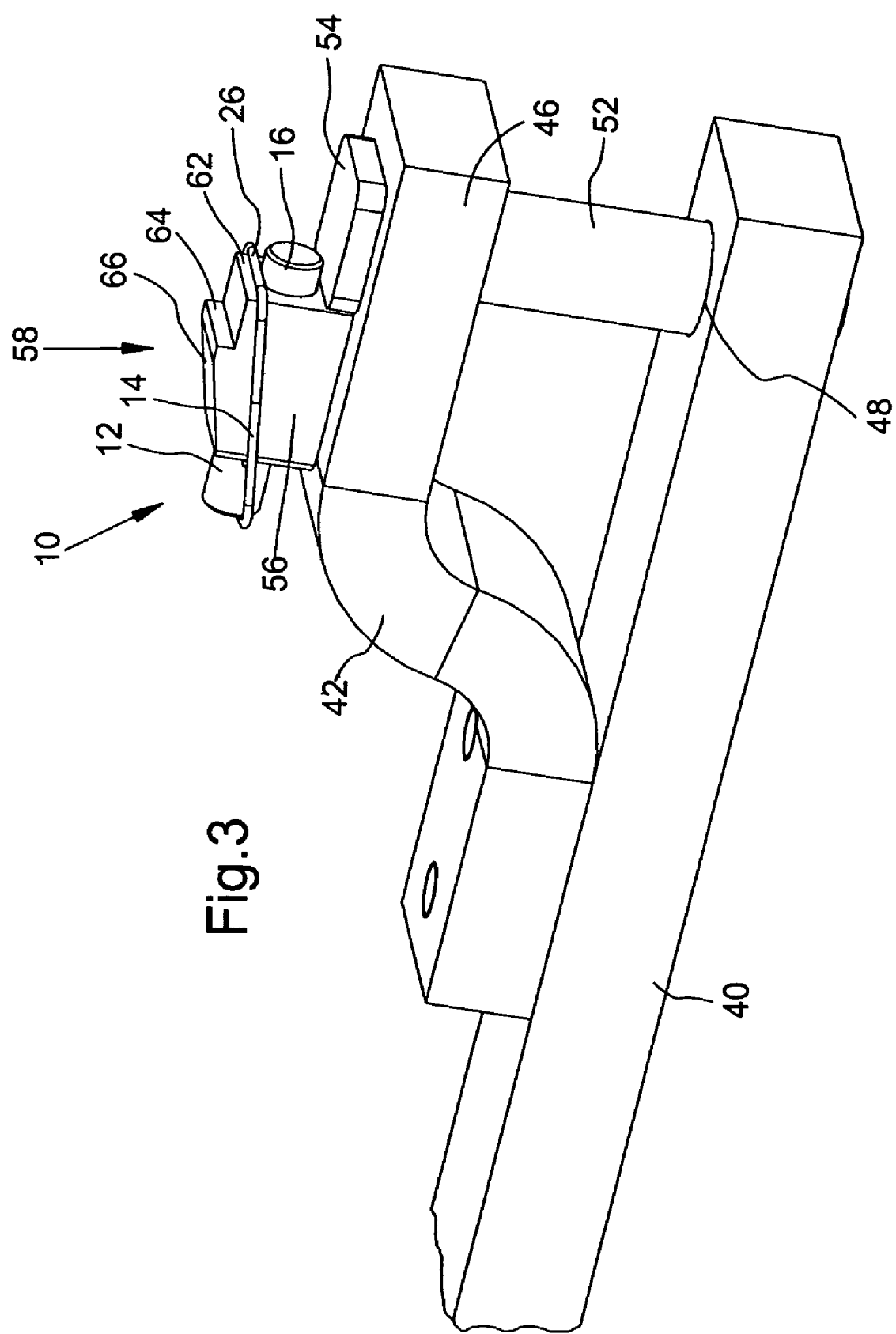
FIG. 3 is a perspective view of the towing device of FIG. 2, but in a locked condition.

FIGS. 2 and 3 show an end portion of a towing device or drawbar, the other end of which (not shown) is pivotally mounted to the frame of a vehicle (not shown). An upper part 42 is bolted to a main towing member 40 through bores 44. The upper part 42 has an S-like shape in the lateral view, and forms a leg 46 which is separated from the main towing member 40 by a space 47. Bores 48 and 50 extend through the free ends of main towing member 40 and upper part 42, respectively. The bores 48 and 50 are mutually aligned, and receive a towing bolt 52. Towing bolt or drawbar pin 52 has a cylindrical shank and a flat head 54 which projects radially from an end of the shank. The head 54 has an essentially square shape, but with rounded corners. The or drawbar pin 52 serves as an attachment point for an eye member (not shown) which is disposed, for example, on a trailer towbar (not shown).

A subassembly body 56 of a locking device 58 is fixed, such as by screws or by welding, on the upper side of the upper part 42. Alternatively, the upper part 42 and subassembly body 56 may be fabricated from a single piece. The subassembly body 56 is essentially rectangular, and has a hole 60 which extends essentially parallel to a longitudinal axis of the towing member 40. The bolt element 12 of FIG. 1 is inserted into the hole 60 from the side opposite to the or drawbar pin 52, so that the chamfered end 18 of bolt element 12 is directed toward the or drawbar pin 52.

The subassembly body 56 has an essentially vertically oriented front or end face 62 which is oriented towards the or drawbar pin 52, and the hole 60 exits through this face 62. The upper portion of body 56 has a step shape, which forms a shoulder 64 which is parallel to the end face 62 and faces in the same direction so that the shoulder 64 and end face 62 both face in a direction genrally parallel to the axis of bolt 12 and toward drawbar pin 52. The upper side of body 56 forms an inclined ramp 66, the distance of which from the axis of the hole 60 increases steadily with progression from the side at which the bolt element 12 is inserted to body 56. The upper side of body 56 also forms surface 68 which extends between the shoulder 64 and the end face 62.

The towing eye member of a towbar (not shown) may be attached to the towing fixture 10 as follows: First, the chamfered end 18 of bolt element 12 is inserted into the hole 60 in subassembly body 56. Then the crossmember 26 of spring element 14 is lifted by the operator and placed on the ramp 66 of subassembly body 56. The bolt element 12 is then inserted farther into the hole 60, during which process the crossmember 26 of spring element 14 is slid further over the ramp 66 until crossmember 26 reaches shoulder 64 and snaps into the position shown in FIG. 2. The bolt element 12 is now prevented from withdrawing, until the crossmember 26 is lifted. Because of the height of the ramp 66, such lifting requires appreciable force. Thus the securing bolt element 10 is securely mounted in the subassembly body 56.

In order to couple the towing members 40, 42 to a trailer eye (not shown), the towing bolt 52 is raised out of bore 48, to enable insertion of the trailer eye into the space 47. Under these circumstances the bolt element 12 will be in its disengaged position shown in FIG. 2, wherein the free end of the shank 16 does not extend out of the body 56 and has no effect on the towing bolt 52. When the opening in the trailer eye is aligned with bores 48, 50, the towing bolt 52 is moved downward and through the trailer eye, and is inserted into bore 48. The head 54 of the towing bolt 52 then lies on the upper side of the leg 46 of the upper part 42. The bolt element 12 is then moved in the direction of the towing bolt 52 until the crossmember 26 of spring element 14 snaps over the shoulder 62 of subassembly body 56, as shown in FIG. 3 and the free end of the shank 16 slides over the upper surface of the head 54 of the towing bolt 52 and locks the towing bolt 52 in this position. This prevents the towing bolt 52 from being accidentally released from the towing fixture and locks the bolt 52 in this position.

Because of the pre-stressing of the spring element 14, element 14 stays in its position shown in FIG. 3. To release towing bolt 52, the operator needs to apply an appreciable force to crossmember 26 to raise it away from surface 68. This allows the bolt element 12 to be withdrawn, until the crossmember 26 of the spring element 14 reaches shoulder 64 and the free end of shank 16 is withdrawn into the hole 60 and no longer interferes in the path of movement of the head 54 of the towing bolt 52. The towing bolt 52 can now be pulled upward, to release the trailer eye.

Figure 4:
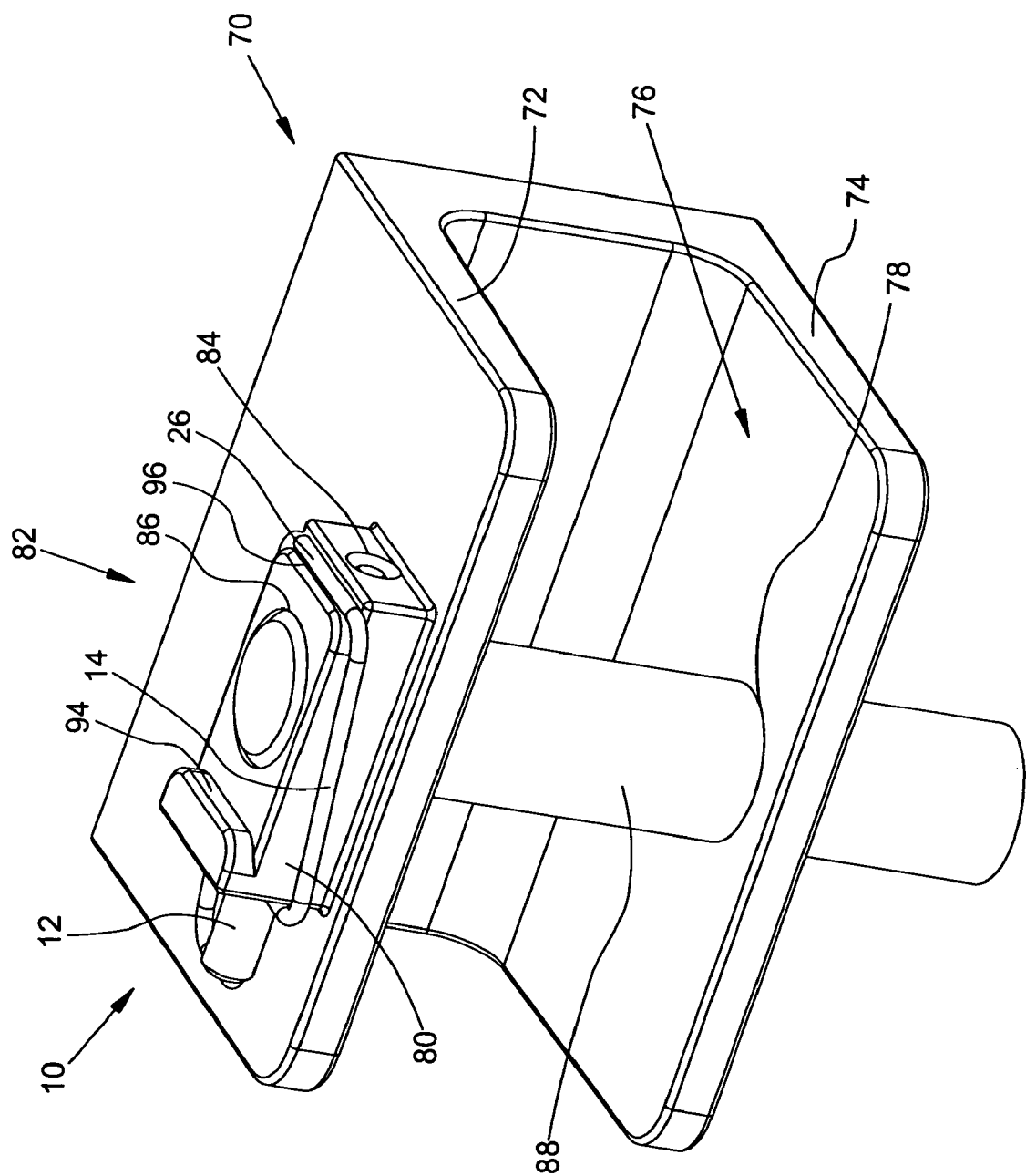
FIG. 4 is a perspective view of an alternative towing device with a locking device for the towing bolt, in a locked state.
Figure 5:
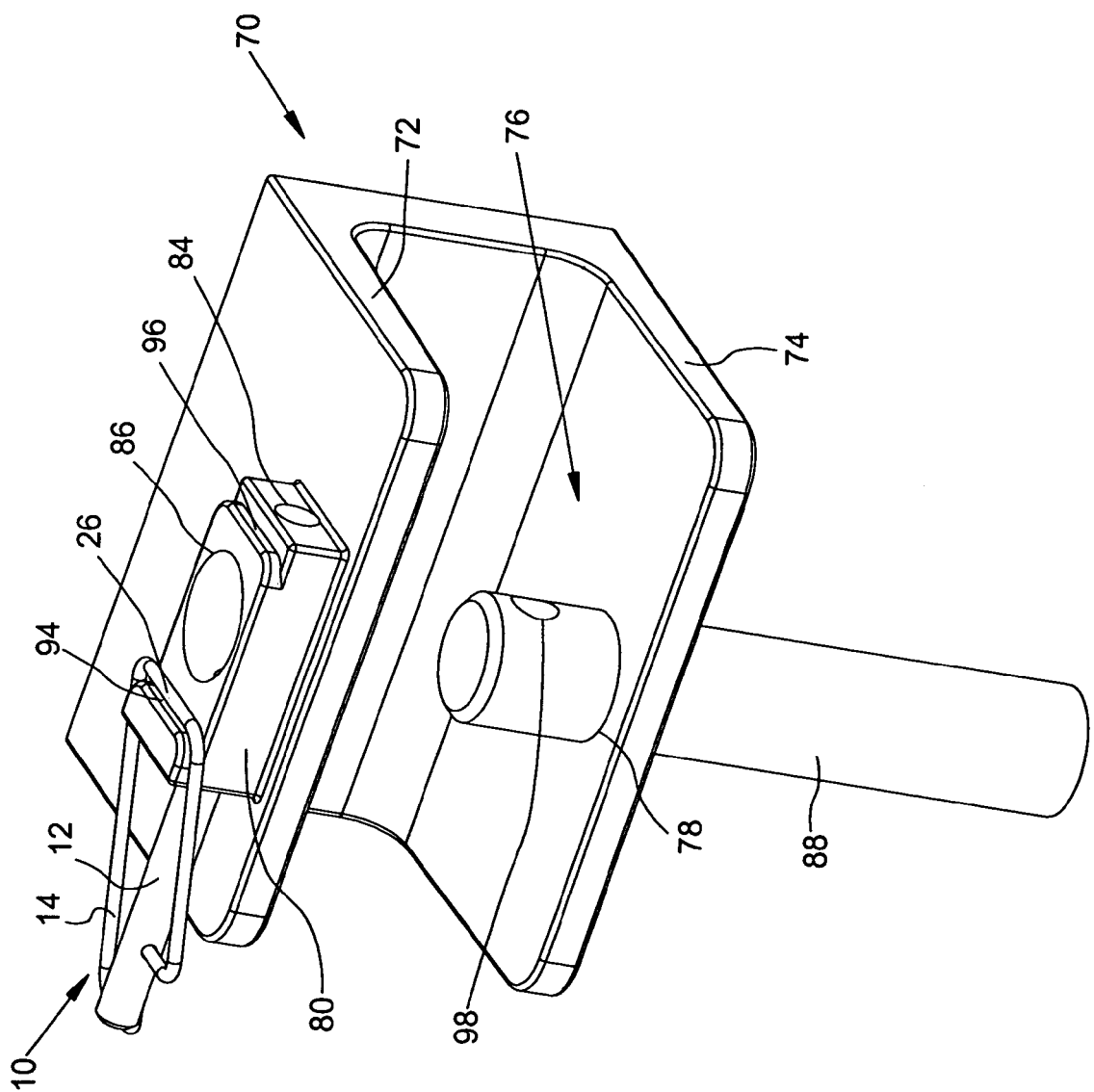
FIG. 5 is a perspective view of the towing device of FIG. 4 in an un-locked state.

Referring now to FIGS. 4 and 5, a towing fitting 70 can be fixed via its back surface (not visible) to a tractor vehicle frame (not shown). The fitting 70 has an upper lateral leg 72 and a lower lateral leg 74 forming a space 76 therebetween. Mutually aligned bores 78 extend through the legs 72 and 74.

A locking device 82 is fixed to the upper side of the upper leg 72 and includes a body 80 which is substantially rectangular and is similar to the body 56 of FIGS. 2 and 3. Body 80 has a bore 84 which can receive the bolt element 12. In addition, a bore 86 extends vertically through body 80 and is aligned with the bores 78. The bores 78 and 86 receive a towing bolt 88. As best seen in FIG. 5, bolt 88 has a transverse bore 98. Bore 98 receives the bolt element 12 when in the locked state shown in FIG. 4, thereby preventing axial and rotational movement of towing bolt 88.

The body 80 has a step on its upper side, and forms two end faces or shoulders 94 and 96 which are parallel to each other and which face in the same direction. The crossmember 26 of spring element 14 can engage these shoulders 94, 96. When the bolt element 12 is substantially withdrawn out of the bore 84, crossmember 26 engages shoulder 94. In this position (FIG. 5) the free end of bolt element 12 does not extend into bore 86, and the towing bolt 88 is freely movable in bores 78 and 86. When the bolt element 12 is moved far enough into bore 84 so that the bolt element 12 extends into bore 86, the crossmember 26 engages shoulder 96. In this position, if the bolt element 12 also extends through the transverse bore 98 of the towing bolt 88, the bolt 88 is thereby fixed or locked to the towing fitting (FIG. 4).

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A locking drawbar assembly comprising:
   a drawbar having a pin bore for receiving a drawbar pin;
   a body mounted on the drawbar adjacent the pin bore, the body having a bolt bore extending therethrough generally perpendicular with respect to the pin bore, the body having a first end face generally perpendicular to an axis of the bolt bore and facing towards the drawbar pin, a second end face facing generally away from the first end face, and a shoulder positioned intermediate said first and second end faces and facing generally towards the drawbar pin;
   a bolt element with a shank which can be inserted into the bolt bore, the bolt element having first and second bores extending into a first end thereof; and
   a spring element having a first end inserted into the first bore in the bolt element, a second end inserted into the second bore in the bolt element, and a crossmember extending transversely to a main axis of the shank, the spring element being biased so that the crossmember is urged towards the shank, the bolt element being axially movable to a locked position wherein a free end of the bolt element extends out of the bolt bore and the crossmember engages the first end face, and the bolt element being axially movable to an unlocked position wherein a free end of the bolt element does not extend out of the bolt bore and the crossmember engages the shoulder.

2. The locking drawbar assembly of claim 1, wherein: the spring element is essentially G-shaped, with a base part forming the crossmember, a first end extending perpendicular with respect to a central axis of the bolt element, and a second end extending parallel to the central axis of the bolt element, the first end being positioned between the crossmember and the second end.

3. The locking drawbar assembly of claim 1, wherein: the body has a step shape which forms the shoulder parallel to the first end face, and a portion of the crossmember is engageable with the shoulder.

4. The locking drawbar assembly of claim 3, wherein: the first end face and the shoulder are spaced apart by an axial distance which is not less than a length of the portion of the bolt element which extends out of the bolt bore when the bolt element is in the locked position.

5. The locking drawbar assembly of claim 1, wherein: the body forms an inclined ramp which extends from a first end adjacent the shoulder to a second end adjacent the second end face, the first end of the ramp being spaced farther away from an axis of the bore than the second end of the ramp.

6. The locking drawbar assembly of claim 1, wherein: the drawbar has an upper leg and a lower leg separated by a space for receiving a trailer eye, the pin bore extending through the upper and lower legs, the body being mounted on the upper leg so that in a locked position the shank of the bolt element extends out of the bore, engages the the drawbar pin and prevents axial movement of the drawbar pin.

7. The locking drawbar assembly of claim 6, wherein: the drawbar pin has a shank and a head which projects radially outwardly with respect to the shank, and in the locked position the shank of the bolt element extends out of the bolt bore and engages the head of the drawbar pin.

8. The locking drawbar assembly of claim 6, wherein: the drawbar pin has a transverse bore extending therethrough; and
the shank of bolt element extends through the transverse bore and through the bore in the body when the bolt element is in the locked position.

* * * * *